United States Patent [19]

Griggs et al.

[11] 4,176,770

[45] Dec. 4, 1979

[54] MOTORCYCLE CANTEEN

[75] Inventors: William K. Griggs, Torrance, Calif.; Harry Holland, Las Vegas, Nev.

[73] Assignee: Tumbleweed Enterprises, Torrance, Calif.

[21] Appl. No.: 937,477

[22] Filed: Aug. 28, 1978

[51] Int. Cl.$^2$ ............................................. B62J 7/00
[52] U.S. Cl. ................................. 224/30 A; 248/360; 215/100 R
[58] Field of Search ................. 224/29 E, 29 R, 30 R, 224/30 A, 32 R, 35, 36, 39; 215/100 R, 100 A; 220/14, 18, 85 H; 248/359, 360, 103, 311.1 R, 313

[56] References Cited

U.S. PATENT DOCUMENTS

| 2,570,644 | 10/1951 | Christophersen | 224/32 R |
|---|---|---|---|
| 4,088,250 | 5/1978 | Schaefer | 224/32 R |

*Primary Examiner*—Joseph J. Rolla
*Assistant Examiner*—Kenneth Noland

*Attorney, Agent, or Firm*—Emmette R. Holman

[57] ABSTRACT

A canteen adapted for mounting astride the cross brace of the handlebars of a motorcycle characterized by a deep rounded groove traversing the total length of the bottom wall of the main body of the canteen, the groove being of sufficient depth and width to completely submerge the cross bar when mounted astride thereof; a bracket affixed to the cross brace having top, front and rear flat faces adapted to wedgingly engage corresponding flat faces of a 2-level cavity formed in the mid-section of the groove when the canteen is placed thereon; a strap threaded through loops in the bracket for securing the canteen about its mid-section; a threaded neck extending from the right wall of the canteen with cooperating screw cap closure secured thereover, the axis of the neck being upwardly tilted in the vertical plane about 10° above the horizontal major longitudinal axis of the canteen, whereby the screw cap closure clears the cross brace to which the canteen is straddingly secured.

17 Claims, 5 Drawing Figures

U.S. Patent    Dec. 4, 1979    4,176,770
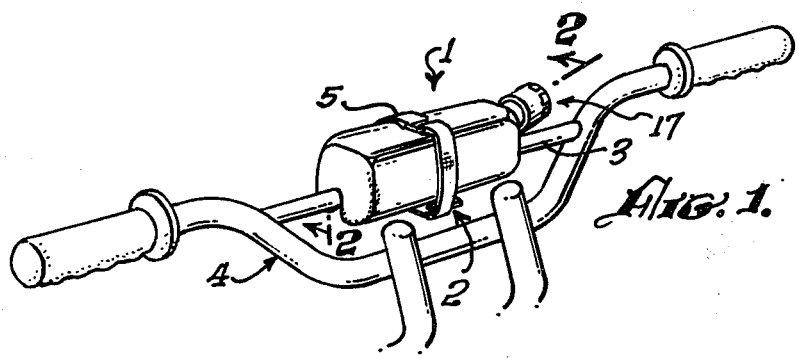
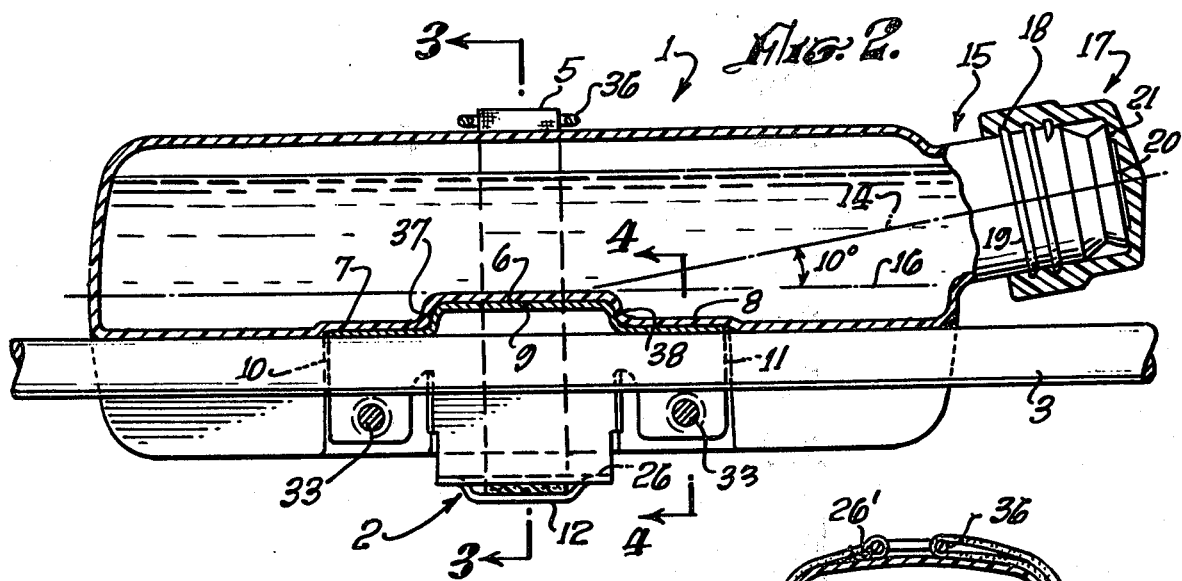
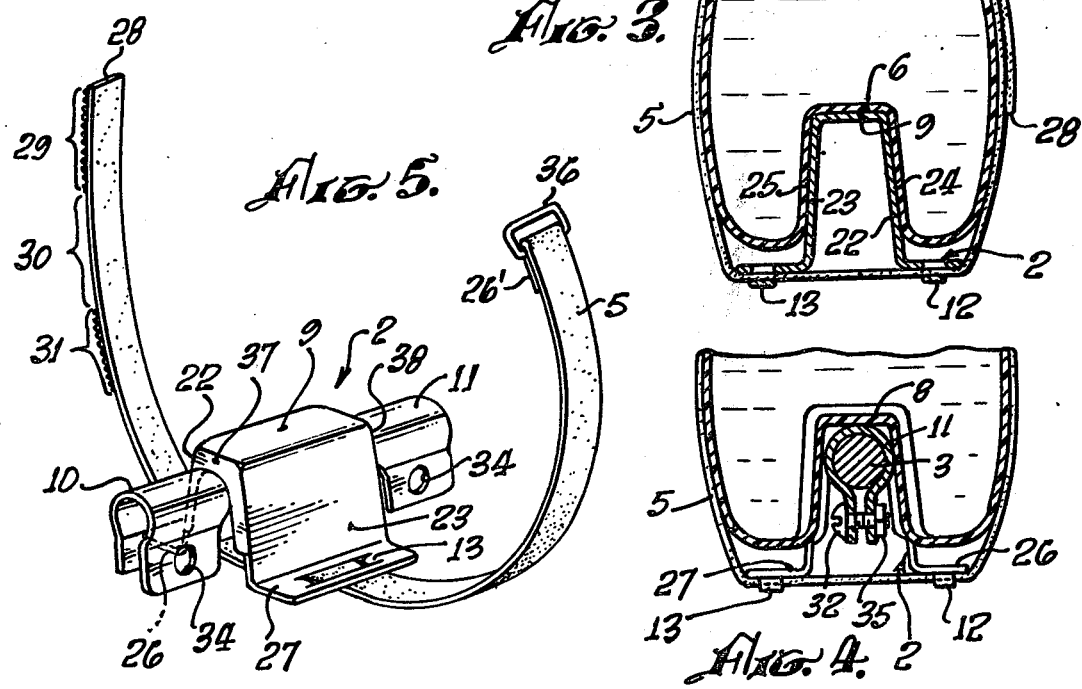

MOTORCYCLE CANTEEN

BACKGROUND OF THE INVENTION

This invention relates to an enduro jug canteen that is removably mounted astride a bracket which is clamped to the crossbrace of the handlebars of a motorcycle and is secured thereto with a strap.

The "enduro" is a dirt bike race covering about 20 to 500 miles over trails, rocks, sand or other terrain, usually in uninhabited areas. The sport is analogous in many respects to the rallye for sports cars.

Dirt bikes as a group generally have crossbraced handlebars as standard equipment. As compared with other types of motorcycles these vehicles are geared for slower speeds, steeper climbs, with fork suspensions built for rougher terrain, tighter turns and higher maneuverability. To avoid excess weight they are built lighter. Street bikes generally are designed for the paved road and are loaded with accessories of all kinds. The heaviest, fastest and most powerful motorcycles fall into this group. Crossbraced handlebars, generally, are not a stock item for this group.

The term "enduro bikes" is misleading, since this refers to a hybrid group falling somewhere between dirt bikes and street bikes. Some enduro bikes have crossbraced handlebars as stock equipment while others do not.

For the purposes of this invention the term "motorcycle" as used herein is intended to include all motorcycles that are equipped with a crossbrace on the handlebars to the exclusion of all others not so equipped.

A canteen adapted for clip-mounting over a bar-like member, specifically over the crash bar of a motorcycle, is taught by Cecil M. Kiser in U.S. Pat. No. 3,920,140, dated Nov. 18, 1975. The front face of the bottle is indented into a deep channel below the neck along a plane perpendicular to the longitudinal axis of the body. A finger is provided that depends from the upper edge of the channel. The clearance between the main body of the bottle and the depending finger is dimensioned to snugly grasp the crash bar. The center of gravity is well below the level of the grasping channel so that the bottle hangs almost erect with neck uppermost, yet it is free to swing like a pendulum from the crash bar. For the purposes of enduro racing, this type of mounting on the crash bar interferes with the freedom of knee movement of the contestant. Over rough terrain, the bottle can readily be knocked loose and be lost or, in the case of a spill, it becomes a separated flying object potentially injurious to the contestant or his rivals.

A tear-drop canteen with a spigot in its side near the bottom of the tank is provided for withdrawal of water according to U.S. Pat. No. 3,741,429 of Jack A. Purcell, Jr., et al dated June 26, 1973. This canteen is designed for permanent mounting on the fore-and-aft member of the bicycle frame that links the seat to the fork. The shape simulates the gasoline tank of a motorcycle, but its high location on top of the bar is hazardous to the contestant on rough terrain, especially in the event of a spill, and it interferes with the freedom of movement of the handlebar in tight turns.

In U.S. Design Pat. No. 239,697 dated Apr. 27, 1976, Kenneth W. Hunt teaches a bottle that is longitudinally curled into a horseshoe cross-section that provides a deep internal channel with walls concentric with the circularly cylindrical exterior wall. The side walls of the channel are re-entrant as seen in cross-section, that is, omega-shaped. The axis of the neck of the bottle is parallel to and aligned with the longitudinal axis of symmetry which is, in turn, parallel to but radially displaced from the axis of the cylindrical wall. There is no teaching of the use or utility of this design. If the bottle were properly dimensioned to be removably snapped over and around the crossbrace of the motorcycle handlebars, combining sufficient flexibility so as to allow forced spreading apart of the ends of the horseshoe cross-section balanced against sufficient rigidity to snugly engage the crossbrace, the bottle potentially could rotate around on the crossbrace under vibration until the open side of the horseshoe channel faced up and then drop off with the jolt of the first hard bump.

The most obvious way is to carry the canteen secured to the belt of the contestant. Because of the high frequency of occurrence of spills during an enduro run, this presents a serious risk of damage to internal organs, such as liver and kidneys and, in addition, hampers the contestant's body twist movements as necessary to clear brush and overhanging rock in tight places.

The above disadvantages of the prior art are overcome, according to the invention, by mounting a canteen astride the crossbrace of the motorcycle handlebars with its longitudinal axis horizontal, utilizing a mounting bracket clamped to the crossbrace and a strap to secure the canteen to the bracket. The body of the canteen is inwardly indented over its entire length to a depth and rounded curvature sufficient to create a channel with outwardly flared sidewalls in which the crossbrace can be totally submerged, including cavity means shaped and dimensioned to receive and to snugly and-/or wedgingly engage at least three supporting plane faces of the bracket.

A screw cap closure is secured to the neck of the bottle. The axis of the neck of the bottle is tilted upward 10° in the vertical plane of the longitudinal axis of the body of the canteen. This vertical displacement permits the screw cap closure to clear the top of the crossbrace with sufficient margin so as to prevent actual contact under severe vibration that could possibly loosen the cap and spill the contents of the canteen. All edges and corners are well rounded to minimize injuries that could be caused by snagging, impalement or cutting of the flesh in forced contact with sharp corners and edges in the event that the contestant falls on the canteen, or is struck by it as a flying object during a spill.

Because of the heat encountered in the sun on desert terrain and the internal pressures that may result, the front, rear, left and right walls of the canteen are bulged outward to improve the structural strength. Taken from the aspect of the contestant when seated behind the canteen mounted on the crossbrace, the "rear" wall of the canteen faces the contestant while the "front" wall faces forwardly away from him, hence the terms "front" and "rear" are the reverse of the draftman's conventional "front view" and "rear view" designations. To avoid this ambiguity, the terms "front" and "rear", for the purposes of this disclosure, including the description of the figures, shall correspond with the front and rear ends, respectively, of the motorcycle.

The bottom wall, with its deep longitudinal channel has a rounded W cross-section, hence a ribbed corrugation. The rigidity of the bottom and its resistance to up-thrust collapse are thereby vastly improved.

One of the objects of the invention is to mount a canteen on a motorcycle without impairing the extent or freedom of movement of the body of the enduro contestant.

Another object of the invention is to mount a canteen on a motorcycle without impairing the low profile of same.

Still another object of the invention is to mount a canteen without appreciably impairing the contestant's range of visibility of the terrain immediately ahead.

A fourth object of the invention is to minimize contestant's risk of snagged clothing, body cuts and bruises that could result from headlong spills over the handlebars or side spills where the fallen contestant is at risk of being struck by his own motorcycle as a flying object.

A fifth object of the invention is to provide convenient means for removably securing a canteen to a motorcycle crossbrace.

A sixth object of the invention is to provide snug fitting bracket means for wedgingly securing a canteen to a motorcycle crossbrace whereby chafing and wear of the abraded contact points of the container to its ultimate perforation or cracking and loss of contents can be eliminated.

BRIEF DESCRIPTION OF THE DRAWINGS

In the drawings:

FIG. 1 is a perspective view from the rear, top, left, showing the canteen assembly mounted on the crossbrace of a motorcycle.

FIG. 2 is a section through 2—2 of FIG. 1 enlarged to show details of the longitudinal groove in the bottom of the canteen, the two-level cavity depressed mid-length of the groove, the bracket snugly engaging a top flat face with the corresponding flat bottom of the cavity, and the vertically tilted axis of the neck and its cooperating screw cap closure.

FIG. 3 is a section through 3—3 of FIG. 2 showing details of the deeper level of the cavity with the top, front and rear faces of the bracket snugly and/or wedgingly engaging corresponding flat faces of the bottom and flared side walls of the cavity.

FIG. 4 is a section through 4—4 of FIG. 2 showing details of the shallower level of the cavity with the right clamping means stretch-formed around and rigidly secured to the crossbrace and the bottom and flared side walls of the cavity tangentially engaging the clamping means.

FIG. 5 is a perspective view from the rear, top, left of the bracket, showing details of left and right clamping means and of strap means threaded through dual loop means depending from the bracket.

DETAILED DESCRIPTION

Referring now to FIG. 1 the canteen, generally indicated as 1, is seen straddlingly mounted on the bracket, generally indicated as 2, which is rigidly clamped to crossbrace 3 of the motorcycle handlebars 4 and is secured thereto by strap means 5. The bottom of the canteen is deeply indented over its entire length, forming a rounded groove with flared side walls of a depth more than sufficient to completely submerge the crossbrace therein and a width sufficient to snugly accommodate the diameter of the crossbrace.

In FIG. 2 the canteen assembly is seen in enlarged vertical section through 2—2 of FIG. 1 with a two-level cavity depressed in the mid-section of the groove. The deeper level 6 is the medial portion and two shallower lateral portions, 7 and 8 are adjacent to the left and to the right, respectively, thereof. The bracket 2 is shown with a horizontal top flat face 9 snugly engaging the corresponding flat bottom of deeper level 6. Clamping means 10 and 11, extending to the left and right, respectively, of top face 9 of the bracket are seen to tangentially engage shallower levels, 7 and 8, respectively, of the cavity, better seen in FIG. 4. Strap means 5 is shown snugly girdling the mid-section of the canteen. It is threaded through front and rear loop means 12 and 13, respectively, (only 12 is seen in FIG. 2), of the bracket and removably secures the canteen to the bracket. The axis 14 of the neck, generally indicated as 15 extending from the right wall, is shown to be upwardly inclined about 10° in the vertical plane of the horizontal vertical axis 16 of the body of the canteen. The screw cap closure, generally indicated as 17, is thereby raised to provide ample clearance between it and crossbrace 3, so the two never touch no matter how severe the vibration. Buttress threads 18 of the cap cooperate with buttress threads 19 of the neck to removably secure the cap to the canteen. The cap 17 sealably engages the finish of flared lip 20 of the neck with flat annular face 21, preferably with an intervening gasket liner, not shown.

FIG. 3 is a sectional view from the right through the deeper level 6 of the cavity. The top flat face 9 of the bracket is seen to snugly engage the flat bottom 6 of the cavity. The front and rear flat faces 22 and 23, respectively, of the bracket 2 are seen to snugly and wedgingly engage the corresponding flared front and rear flat side walls 24 and 25, respectively, of the deeper level of the cavity. Each of these faces and flared sidewalls are shown to be inwardly inclined about 10° from the vertical so as to provide a positive draft. Depending from the lower edge of faces 22 and 23 are horizontal tabs 26 and 27, respectively, bearing expandedly stamped out loop means 12 and 13, respectively.

Strap means 5 is shown threaded through loop means 12 and 13, and girdling the mid-section of the canteen. The left end 26' of the strap is threaded through a rigid loop 36, then is folded back and secured to itself by stitching, riveting, adhesive or other suitable joining means, not shown. The right end of the strap starting at the tip 28 is covered on the outside with a length of VELCRO* hook binding fabric 29, followed by a somewhat equal vacant length 30 of no fabric, followed by an equal length of VELCRO* loop binding fabric 31 shown in FIG. 5 but not shown in FIG. 3. As seen in FIG. 3 the right end 28 is threaded through rigid loop 36, tightly drawn and folded back on itself. When the lengths of strap means 5, loop and hoop fabric segments 29 and 31, respectively, and of vacant no fabric segment 30 are properly selected with respect to the girth of the canteen, the loop and hook segments will cooperatively engage each other over most if not all of their length to adjustably and removably secure the canteen to the bracket.

*VELCRO is a T.M. of VELCRO USA, Inc., 681 Fifth Avenue, New York, N.Y., for a hook and loop fastener.

FIG. 4 is a sectional view from the right through the shallower level 8 of the cavity where the clamping means 11 is shown stretch-formed about the circumference of crossbrace 3 and rigidly affixed thereto by screw 32 threaded through front and rear holes 33 and 34, respectively, in the left and right omega-shaped clamping means, 10 and 11 alike (best seen in FIG. 5) and tightly secured by screwing into cooperating nut 35.

FIG. 5 is a perspective view of the canteen assembly minus the canteen itself and minus the screws and nuts, 32 and 35, respectively. The strap means 5 is shown threaded through the front loop means 12 (not visible) and rear loop means 13, expandedly stamped out of the metal of horizontal tabs 26 and 27 depending from the lower edge of front and rear faces 22 and 23, respectively. Left and right shoulders 37 and 38 are shown depending from the left and right edges, respectively, of flat top face 9 of the bracket. Left and right clamping means 10 and 11, respectively, of omega cross-section, are shown depending from shoulders 37 and 38, respectively.

The canteen may be formed by blow-molding a thermoplastic polymer selected from the group consisting of polypropylene and polyethylene. The corners and edges alike are well rounded to a radius of about 0.25". The front, rear, left and right walls bulge outwardly to a radius of about 6 inches. The canteen has a capacity of about 1 quart, preferably. The axis of the neck is upwardly tilted about 10° in the vertical plane of the horizontal central longitudinal axis of the main body, whereby the neck and its cooperating screw cap closure are raised sufficiently to amply clear the crossbrace, so that there is no physical contact of the cap with the crossbrace, even under the hardest predictable jolt, whereby the cap could be jarred loose and the contents lost under continued vibration.

The width and depth of the longitudinal groove of the canteen may vary depending on the diameter of the crossbrace on which it is to be mounted. For most cases we have found satisfactory a depth of about 1.19 inches, an inside width of about 0.63 inch flaring to an outside width of about 0.81 inch, the side walls being inclined about 10° from vertical in their flat portions bounded by rounded inside and outside edge curvatures of about 0.25 inches radius.

The cavity depressed into the mid-section of the groove consists of 3 portions, i.e., a deeper level medial portion flanked on its left and on its right by a shallower level portion. The medial deeper level portion has a flat, horizontal, rectangular bottom at a depth of about 1.5 inches which is about 2 inches long and about 0.69 inch wide flaring to about 1 inch outside width along flat sloping side walls inclined about 10° from vertical. The two adjacent lateral shallower portions of the cavity are separated from the deeper medial portion by shoulders corresponding to left and right shoulders 37 and 38, respectively, of the bracket 2, which they cooperatively engage when the canteen is mounted on the bracket. At the same time the top, front and rear flat faces 9, 22 and 23 of the bracket intimately engage corresponding bottom, front and rear flat faces 6, 22 and 23 of the deeper medial portion of the cavity in a snug and/or wedgingly fitting juncture.

The two lateral shallower portions have a bottom 7 and 8 at a depth of about 1.25 inches, a length of about 1 inch and an inside width of about 0.66 inch flaring to an outside width of about 0.88 inch at an angle of about 10° from vertical. The bottoms 7 and 8 of the left and right shallower cavities tangentially engage the corresponding left and right cylindrical clamping means 10 and 11 when the canteen is mounted on the bracket.

The screw cap closure means is of conventional construction. The threads on the neck of the canteen as well as in the cap are preferably buttress threads. The cap may have a gasket liner of the conventional yieldably sealing type, or a thin flexible disk insert which is cantilever-biased against the lip by a slightly raised circular boss inside the cap under the disk, the boss being of smaller diameter than the finish of the lip of the canteen. The lip is conically flared with a finish in a plane normal to the tilted axis of the neck.

The bracket includes 3 primary canteen-engaging surfaces: the top, front and rear faces 9, 22 and 23, respectively. Secondary vertical support of the canteen arises from tangential lines of contact at the top of cylindrically formed left and right clamping means, 10 and 11, respectively, and at the top of the crossbrace 3 contacting the bottom of the groove to the left and right of the two-level cavity. Secondary horizontal support is provided by the left and right shoulders 37 and 38 of the bracket which engage corresponding shoulders in the deeper level portion of the cavity to prevent longitudinal slippage along the crossbrace.

The bracket may be constructed as a deep-drawn stamping of mild steel which is the preferred embodiment of the invention. The tightening screw and nut may be of any suitable metal, preferably of mild steel or stainless steel. Lockwashers (not shown) or equivalent locking means should be provided.

The strap means is preferably of webbing construction made of material selected from the group consisting of polypropylene, nylon, polyester and cotton. To accommodate a canteen of about 11.5 inches in girth, an appropriate stretched length of strap from tip 28 to the end of attached loop 36 is about 14.7 inches, and the width about 0.75 inch. Starting at tip 28 and advancing in the direction toward 36, a segment about 2 inches long of VELCRO* loop fabric 29 is attached to the outside of strap 5. Then follows a vacant segment 30 of no attached fabric for about 2.25 inches, and thereafter a segment 31 about 2 inches long of VELCRO* hook fabric. We have found with this distribution of fabric that the two VELCRO* segments overlap at least 75% of each other's effective area which provides an effective failure-proof closure of the strap loop. The right loop means 36 may be constructed of material selected from the group consisting of steel, stainless steel, brass, bronze, copper, aluminum, magnesium, titanium and rigid polymeric resins.

It is clearly evident that the bracket 2 is symmetrical left and right as well as front and rear. Consequently, the canteen can be mounted with screw cap to the right as shown or to the left, not shown, without departing from the invention disclosed herein.

We claim:

1. In a canteen assembly adapted for mounting on the crossbrace of the handlebars of a motorcycle, the improvement consisting of:
   (a) a bracket, including clamping means at the left and right ends thereof securing it to said crossbrace,
   (b) support means on said bracket for supporting a canteen and, including a rectangular, horizontal, top face bounded by front, rear, left and right edges,
   (c) depending from said front and rear edges, respectively, are front and rear rectangular faces the top edges of each being inclined inwardly at an angle of about 10° from vertical,
   (d) loop means depending from the bottom edge of said front and rear rectangular faces, respectively, adapted to receive and retain a holding strap,
   (e) a length of holding strap threaded through said loop means, said holding strap being provided with securing means at each end for adjustably securing one end to the other end, (f) said canteen consisting of a bottle main body bounded by 6 walls: top, bottom, front, rear, left and right walls, a threaded neck emerging from the right wall, terminating in a mouth surrounded by a lip sealably engageable with gasket means of a removable screw cap closure engaging the threads of said threaded neck, (g) said bottom wall of said bottle main body being deeply creased inwardly to form a longitudinal groove traversing the entire length of said main body in sufficient depth and width that the crossbrace of said handlebars can be completely received by said longitudinal groove, (h) a 2-level cavity depressed into the mid-section of said groove, shaped and dimensioned in its medial deeper level portion to intimately engage said top face and to wedgingly engage said inclined front and rear rectangular faces; two lateral shallower level portions, positioned left and right of said medial deeper level portion, having a depth and diameter sufficient to clear said clamping means at the left and right ends, respectively, of said bracket when said canteen is straddlingly mounted over said bracket which is securely clamped to said crossbrace, and (i) said holding strap being snugly wrapped around the midsection of said canteen and each of its ends secured one to the other, thereby securing the canteen assembly to the crossbrace of the motorcycle.

2. A canteen assembly according to claim 1 which said canteen is molded of a polymeric resin selected from the group consisting of polyethylene and polypropylene.

3. A canteen assembly according to claim 1 wherein all edges of said support means and corners between adjacent walls of said canteen are rounded to a radius of at least about ¼ inch.

4. A canteen assembly according to claim 3 wherein said front, rear, left and right walls bulge outwardly to a radius of about 6 inches.

5. A canteen assembly according to claim 4 which said canteen has a holding capacity of about one quart.

6. A canteen assembly according to claim 5 wherein the axis of the neck is tilted in a vertical plane about 10° from the horizontal central longitudinal axis of the main body, whereby the neck and its cooperating screw cap closure are raised sufficiently to clear the crossbrace on which the canteen is mounted.

7. A canteen assembly according to claim 6 wherein said longitudinal groove has a depth of about 1.19 inches, and an outside width of about 0.81 inch tapering down to an inside width of about 0.63 inch.

8. A canteen assembly according to claim 7 wherein the flat medial deeper level portion of said 2-level cavity in the mid-section of said groove has a depth of about 1.5 inches, a length of about 2 inches and an outside width of about 1 inch tapering down to an inside width of about 0.69 inch.

9. A canteen assembly according to claim 8 wherein the two lateral shallower level portions left and right of said deeper level portion have a depth of about 1.25 inches, a length of about 1 inch and an outside width of about 0.88 inch tapering down to an inside width of about 0.66 inches.

10. A canteen assembly according to claim 9 wherein said lip which is conically flared is terminated in a plane normal to said tilted axis of the neck.

11. A canteen assembly according to claim 10 wherein said threads of said threaded neck and threads of said cooperating screw cap closure are buttress threads.

12. A canteen assembly according to claim 11 wherein said clamping means consist of downwardly open omega-shaped tabs at the left and right ends of said bracket, both arms of said omega being perforated near their free ends to receive screw and nut means threaded therethrough after placing the bracket on said crossbrace and, by tightening of said screw and nut means, stretch-forming said omega snugly around said crossbrace into a conforming circular arc thereby securing said bracket to said crossbrace.

13. A canteen assembly according to claim 12 wherein said length of holding strap is a length of woven webbing material selected from the group consisting of polypropylene, nylon, polyester and cotton.

14. A canteen assembly according to claim 13 wherein said securing means for said holding strap consists of a rigid loop means secured at one end and at the other end a VELCRO* fastener consisting of a segment of VELCRO* loop fabric followed by a length of holding strap segment left vacant of VELCRO* fastener material and finally followed by a segment of VELCRO* hook fabric bonded to the same side of the holding strap as the above segment of VELCRO* loop fabric.

15. A canteen assembly according to claim 14 wherein said rigid loop means is constructed of material selected from the group consisting of: steel, stainless steel, brass, bronze, copper, aluminum, magnesium, titanium, and rigid polymeric resins.

16. A canteen assembly according to claim 15 wherein said holding strap is about 14 inches long and about ¾ inch wide.

17. A canteen assembly according to claim 16 wherein said segments of VELCRO* hook fabric and VELCRO* loop fabric are each about 2 inches long and, intervening therebetween, said length of holding strap segment left vacant of VELCRO* fastener material is about 2¼ inches long.

* * * * *